April 15, 1941.   R. WELLENSTEIN   2,238,668
DEVICE FOR THE PRODUCTION OF SOUND VIBRATIONS OF DEFINITE
FREQUENCY BY MEANS OF A PIPE OR WHISTLE
Filed March 17, 1939
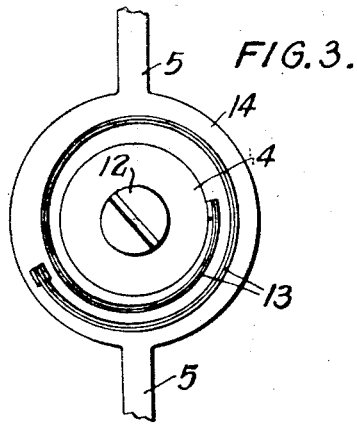
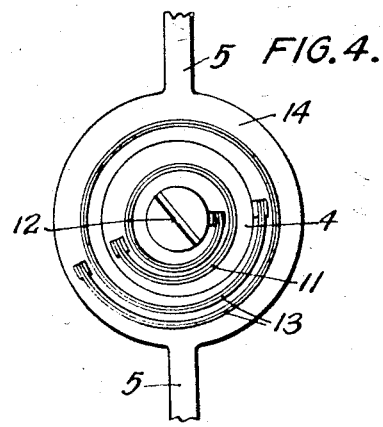
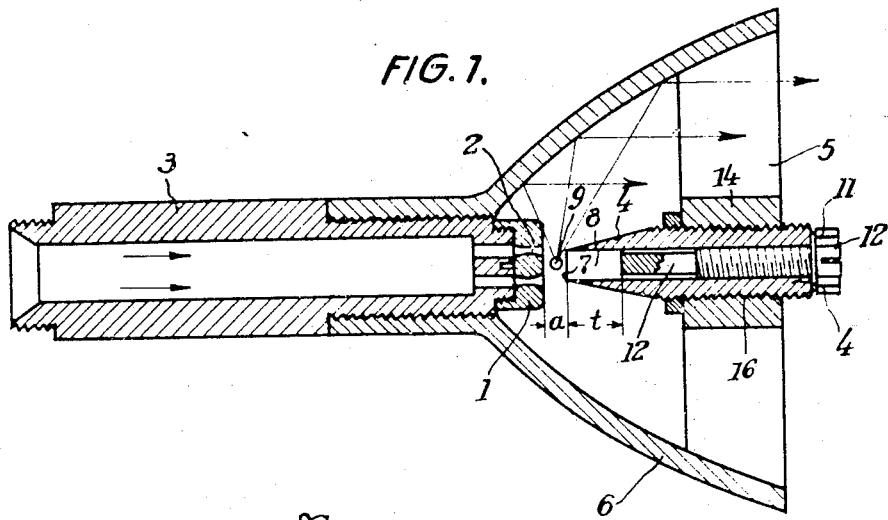
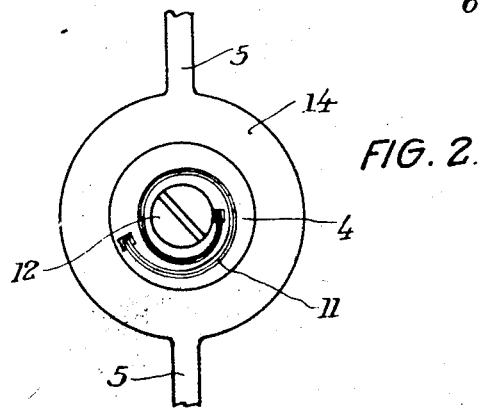
Inventor
R. Wellenstein.
By: Glascock Downing & Seebold
Attorneys Patented Apr. 15, 1941

2,238,668

UNITED STATES PATENT OFFICE 2,238,668

DEVICE FOR THE PRODUCTION OF SOUND VIBRATIONS OF DEFINITE FREQUENCY BY MEANS OF A PIPE OR WHISTLE

Robert Wellenstein, Bremen, Germany

Application March 17, 1939, Serial No. 262,514
In Germany February 15, 1938

11 Claims. (Cl. 116—137)

The invention relates to a device for producing sound vibrations of definite frequency by means of a whistle or pipe, in particular for transmitting signals on vehicles. It is known that these sound producers present a very low attenuation, whereby it is possible to emit a sharply limited frequency. The narrow frequency band of these sound producers lead to disadvantages in operation. It is in particular difficult to ensure the accordance or agreement between the natural frequency of the receiver structure and the pipe frequency, necessary for a good signal transmission, if it is desired to attain this signal transmission with a good efficiency. While it is possible on the receiver side, by damping the receiver, to attain a widening of the frequency range and in this way to avoid the transmitter and receiver falling out of tune, such a damping is nevertheless undesired as a great sacrifice in sensitiveness and reduction of selectivity.

In the case of signal transmission on vehicles, or in aircraft echo sounding, these drawbacks are still noticeably disturbing in spite of the measures which are taken.

These phenomena are mainly to be attributed to the frequency of the pipes or whistles depending upon the sound velocity of the gas in the mouth of the whistle. The sound velocity, however, varies with the temperature, so that the whistle frequency is also dependent upon temperature. Normally, this plays no great part, and can easily be compensated by the above-mentioned measures on the receiving side. In the particular case, however, where the whistle is used at extreme differences of temperature (± 30° centigrade) such as occur in the case of signal transmission on vehicles, or in aircraft echo sounding and in the case of automobile overhauling signal installations, the dependence upon temperature of the whistles leads to unsatisfactory detuning.

This drawback is obviated according to the invention by the depth of the whistle mouth or the distance between the lip and the mouth of the whistle being made automatically regulatable by a member dependent upon temperature. In this way the variations of the frequency of the transmitter dependent upon fluctuations of the temperature can be completely compensated. Using a narrow frequency band on the receiver side and even working with the maximum fluctuations of temperature, a disagreement between transmitter frequency and receiver frequency is then definitely avoided and in this way a uniformly good signal transmission is ensured.

An example of carrying out the invention is shown in the accompanying drawing.

Fig. 1 is a longitudinal section through a whistle constructed according to the invention.

Fig. 2 is an end elevational view of the temperature responsive means shown in Fig. 1.

Fig. 3 is an end elevational view of a modified arrangement of the temperature responsive element.

Fig. 4 is an end elevational view showing a combination of the temperature responsive elements illustrated in Figs. 2 and 3.

The whistle shown by way of example consists essentially of a so-called lip 1 provided with an annular outlet channel 2 which is connected to a tube 3 for the delivery of the operating air or other operating medium, and a cylindrical body 4 forming the so-called whistle mouth directed against the whistle lip with a bevelled edge 7. The body 4 is arranged at a certain distance from the lip 1 and supported by a hub member 14. The hub member is held in position by two ribs 5 in the opening of a member 6 which is formed as a parabolic funnel.

To produce the sound, air is blown through the annular conduit 2 of the lip 1 in a thin jet against the edge or sharp rim 7 of the mouth of the whistle. By the co-operation of the edge 7 and of the column of air 8 enclosed by the mouth, sound oscillations then take place, the point of origin 9 of which can be assumed to be in the centre of the free space between mouth and lip.

The whistle or pipe represents a complicated oscillatory structure. Its frequency is essentially determined by the height of the column of air or depth $t$ of the mouth and the distance $a$ between the edge of the mouth 7 and the lip 1, the frequency decreasing with increasing depth $t$ and increasing distance $a$. In addition, however, the frequency also depends upon the sound velocity in the medium of the whistle gas. As the sound velocity varies with the temperature, the whistle frequency is not a value predetermined for all conditions by the whistle dimensions $t$ and $a$, but is dependent upon the fluctuations of the temperature. With temperature differences of, for example, ± 30° centigrade, as occur in the signal transmission on vehicles and in particular in the echo sounding on aircraft, fluctuations arise in the frequency of 11%. Thus with a frequency of for example 3,000 cycles per second, frequency variations of 330 cycles per second take place. In order, in spite of these fluctuations of frequency to avoid the transmitter frequency falling out of the range of sensitivity provided at the receiver, without having to effect on the receiver side a damping which undesirably reduces the sensitiveness or selectivity, according to the invention means is provided by which the temperature fluctuations in the whistle are automatically compensated. The temperature responsive means moves parts of the whistle which determines the frequency, such as the depth of the mouth $t$ or the distance $a$ between the edge of the mouth 7 and the lip of the whistle 1, or by the simultaneous regulation of the two values.

This regulation is effected in the embodiment shown in Figs. 1 and 2 by a bimetallic strip 11 wound in spiral form around the end of the screw plug 12 determining the depth of the mouth $t$ and at its outer end is fixed on the mouth body 4 and at its inner end on the plug 12. By means of this bi-metallic strip, the plug which is held in the mouth body by a coarse pitch thread, is rotated according to the prevailing temperature, so that the depth of mouth $t$ increases if the temperature rises, and vice versa. The result is thereby attained that the frequency of the whistle is independent of temperature and there can be used at the receiver a frequency band of less width and greater steepness, without danger of discrepancy between transmitter and receiver frequencies.

There is also the possibility of effecting, instead of a variation of the depth of mouth, a corresponding variation of the distance $a$ from mouth to the lip. Such an adjustment may be accomplished with the arrangement shown in Fig. 3 wherein the body 4 is rotated with respect to the hub member 14 by means of a spiral shaped bimetallic strip 13. The temperature responsive element 13 is secured at the outer end thereof to the hub member 14 and the inner end thereof is attached to the body 4. The body 4 is therefore moved towards or away from the lip 1 during rotation thereof by the threads 16. These two variations can also be carried out simultaneously and in the same sense. Simultaneous movement of the plug 12 and the body 4 may be carried out by the arrangement shown in Fig. 4. In this modification the plug 12 is adjusted by a temperature responsive element 11 in a manner as shown and described in connection with Figs. 1 and 2. The adjustment of the body 4 relative to the lip 1 in Fig. 4 is effected by means of the spiral shaped bimetallic element 13 which is arranged and functions like the arrangement shown in Fig. 3. This arrangement has the advantage that a comparatively large range of regulation is covered by small displacements.

What I claim is:

1. A device for producing sound vibrations of a predetermined frequency comprising in combination, sound producing means including movable means for varying the frequency of sound vibrations produced thereby, and means responsive to temperature variations adjacent the sound producing means for shifting said movable means to a position to maintain a predetermined frequency of said sound vibrations.

2. A device for producing sound vibrations of a predetermined frequency comprising in combination, means for setting a gaseous medium in vibration to produce sound waves including movable means for varying the frequency of the sound waves, and means responsive to temperature variations tending to vary the frequency of the sound waves produced by the first mentioned means for shifting said movable means to a position to maintain a predetermined frequency of sound waves.

3. A device for producing sound vibrations of a predetermined frequency comprising in combination, a whistle for setting a gaseous medium in vibration to produce sound waves, movable means for varying the frequency of the sound waves produced by said whistle, and temperature responsive means for shifting said movable means to maintain a predetermined sound wave frequency when temperature variations tend to vary the frequency of the sound waves produced by said whistle.

4. A device for producing sound vibrations of a constant frequency comprising in combination, a whistle including a hollow body and a lip member spaced therefrom for directing a gaseous medium into the hollow body to produce sound waves, a plug closing the hollow body, and means responsive to temperature variations tending to alter the frequency of said sound waves for shifting the hollow body relative to the lip member to maintain the frequency of the sound waves constant.

5. A device for producing sound waves of a constant frequency comprising in combination, a whistle including a hollow body and a lip member spaced therefrom for directing a gaseous medium into the hollow body to produce sound waves, a shiftable plug closing said hollow body for varying the frequency of the sound waves, and means responsive to the temperature variations tending to alter the frequency of the sound waves produced by said whistle for moving said plug to a position to maintain the frequency of said sound waves constant.

6. A device for producing sound waves of a constant frequency comprising in combination, a whistle including a hollow body and a lip member spaced therefrom for directing a gaseous medium into the hollow body to produce sound waves, a shiftable plug closing said hollow body for varying the frequency of the sound waves, and temperature responsive means for moving said hollow body and said plug to positions to maintain the frequency of said sound waves constant upon variations of temperature tending to alter the frequency of the sound waves produced by the whistle.

7. A device for producing sound vibrations of a constant frequency comprising in combination, a whistle including a hollow body and a lip member spaced therefrom for directing a gaseous medium into the hollow body to produce sound waves, a plug closing said hollow body and threaded therein for varying the frequency of said sound waves, and means responsive to temperature changes tending to alter the frequency of the sound waves produced by the whistle for rotating said plug to move the same to a position to maintain the frequency of the sound waves constant.

8. A device for producing sound vibrations of a constant frequency comprising in combination, a support, a whistle including a hollow body threaded in said support and a lip member spaced therefrom for directing a gaseous medium into the hollow body to produce sound waves, a plug closing said hollow body, and means responsive to temperature variations tending to alter the frequency of the sound waves produced by said whistle for rotating the hollow body in said support so as to move the same into a position to maintain the frequency of said sound waves constant.

9. A device for producing sound vibrations of a constant frequency comprising in combination, a support, a whistle including a hollow body threaded in said support and a lip member spaced therefrom for directing a gaseous medium into the hollow body to produce sound waves, a plug closing said hollow body and threaded therein, means responsive to temperature variations tending to vary the frequency of the sound waves produced by said whistle for rotating said plug and said hollow body to shift the positions thereof relative to the lip member so as to maintain the frequency of the sound waves constant.

10. A device for producing sound vibrations of a constant frequency comprising in combination, a whistle including a hollow body and a lip member spaced therefrom for directing a gaseous medium into the hollow body to produce sound waves, a shifting plug closing said hollow body for varying the frequency of the sound waves, means for shifting said plug away from said lip member when the temperature of said gaseous medium increases and for moving the plug towards said lip member when the temperature of the gaseous medium decreases so as to maintain the frequency of the sound vibrations constant.

11. A device for producing sound vibrations of a constant frequency comprising in combination, a whistle including a hollow body and a lip member spaced therefrom for directing a gaseous medium into the hollow body to produce sound waves, a plug closing the hollow body, means for moving said hollow body away from said lip member when the temperature of the gaseous medium increases and moving said hollow body towards said lip member when the temperature of the gaseous medium decreased.

ROBERT WELLENSTEIN.